US007064456B2

(12) United States Patent
Hirota et al.

(10) Patent No.: US 7,064,456 B2
(45) Date of Patent: Jun. 20, 2006

(54) DOOR LOCK RELEASE DEVICE

(75) Inventors: Koichi Hirota, Takahama (JP); Masachika Kamiya, Toyota (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 477 days.

(21) Appl. No.: 10/389,739

(22) Filed: Mar. 18, 2003

(65) Prior Publication Data

US 2004/0026999 A1 Feb. 12, 2004

(30) Foreign Application Priority Data

Mar. 18, 2002 (JP) ............................ 2002-074965

(51) Int. Cl.
*B60K 28/14* (2006.01)

(52) U.S. Cl. ..................... 307/10.1; 180/274; 70/278.1

(58) Field of Classification Search .................. 701/49; 180/281, 274, 282; 70/278.1, 278.7
See application file for complete search history.

(56) References Cited

U.S. PATENT DOCUMENTS

| | | | | | |
|---|---|---|---|---|---|
| 4,785,907 | A | * | 11/1988 | Aoki et al. | 180/274 |
| 5,547,208 | A | * | 8/1996 | Chappell et al. | 180/281 |
| 5,574,315 | A | * | 11/1996 | Weber | 307/10.1 |
| 5,769,471 | A | * | 6/1998 | Suzuki et al. | 292/336.3 |
| 5,975,231 | A | * | 11/1999 | Hirato | 180/274 |
| 6,411,875 | B1 | * | 6/2002 | Ugusa et al. | 701/49 |
| 6,412,584 | B1 | * | 7/2002 | Faigle et al. | 180/274 |
| 6,877,348 | B1 | * | 4/2005 | Buecker et al. | 70/264 |
| 2004/0059488 | A1 | * | 3/2004 | Iida | 701/49 |

FOREIGN PATENT DOCUMENTS

| | | | | |
|---|---|---|---|---|
| JP | 54057720 | A | * | 5/1979 |
| JP | 63-3772 | B2 | | 1/1988 |
| JP | 5-49797 | B2 | | 7/1993 |
| JP | 6-146688 | A | | 5/1994 |

* cited by examiner

*Primary Examiner*—Stephen W. Jackson
*Assistant Examiner*—Andrew M. Deschere
(74) *Attorney, Agent, or Firm*—Buchanan Ingersoll PC

(57) ABSTRACT

A door lock release device includes an actuator for releasing a door lock, a first detection means for detecting an operation of a door handle, a first control circuit for controlling an actuation of the actuator based on the detected door handle operation, a second detection means for detecting a vehicle state, and a second control circuit independent from the first control circuit for controlling the actuation of the actuator based on the detected vehicle state.

9 Claims, 4 Drawing Sheets

DOOR LOCK RELEASE DEVICE

This application is based on and claims priority under 35 U.S.C. § 119 with respect to Japanese Patent Application No. 2002-074965 filed on Mar. 18, 2002, the entire content of which is incorporated herein by reference.

FIELD OF THE INVENTION

The present invention relates to a door lock release device. More particularly, the present invention pertains to a door lock release device for performing a door lock release in accordance with detected vehicle states.

BACKGROUND OF THE INVENTION

A known door lock release device for performing a door lock release in accordance with detected vehicle states is disclosed in Japanese Patent Laid-Open Publication No. H06-146688. With the known door lock release device, a release of a door lock is prohibited by a main control portion (i.e., CPU) of a control circuit (i.e., controller) irrespective of the operation of a door handle during detecting a driving state of the vehicle by vehicle speed. Thus, the door is prevented to open by wrong handle operation during the vehicle driving.

In case impact due to collision is detected, the release of the door lock is allowed at the main control portion of the control circuit irrespective of the detection of the vehicle speed (i.e., driving state of the vehicle). Accordingly, the door is open promptly at the collision.

According to the known door lock release device for performing the door lock release in accordance with detected vehicle states disclosed in Japanese Patent Laid-Open Publication No. H06-146688, the actuation (i.e., release) control of the door lock based on the detected vehicle driving state is performed only by the main control portion. Thus, in case a drive signal for releasing the door lock is output due to the overriding of the CPU, unexpected, or undesired door opening may be caused.

A need thus exists for a door lock release device which restrains erroneous operation for a door lock release and an unexpected, or undesired door opening.

SUMMARY OF THE INVENTION

In light of the foregoing, the present invention provides a door lock release device which includes an actuator for releasing a door lock, a first detection means for detecting an operation of a door handle, a first control circuit for controlling an actuation of the actuator based on the detected door handle operation, a second detection means for detecting a vehicle state, and a second control circuit independent from the first control circuit for controlling the actuation of the actuator based on the detected vehicle state.

According to another aspect of the present invention, a door lock release device controlling method includes actuating an actuator for releasing a door lock based on an operation of a door handle detected by a first detection means and a vehicle state detected by a second detection means. The door lock release device actuates the actuator for releasing the door lock when an actuation of the actuator is allowed by both a first control circuit for controlling the actuation of the actuator based on the detected operation of the door handle and a second control circuit provided independent from the first control circuit for controlling the actuation of the actuator based on the detected vehicle state.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Figure 1:
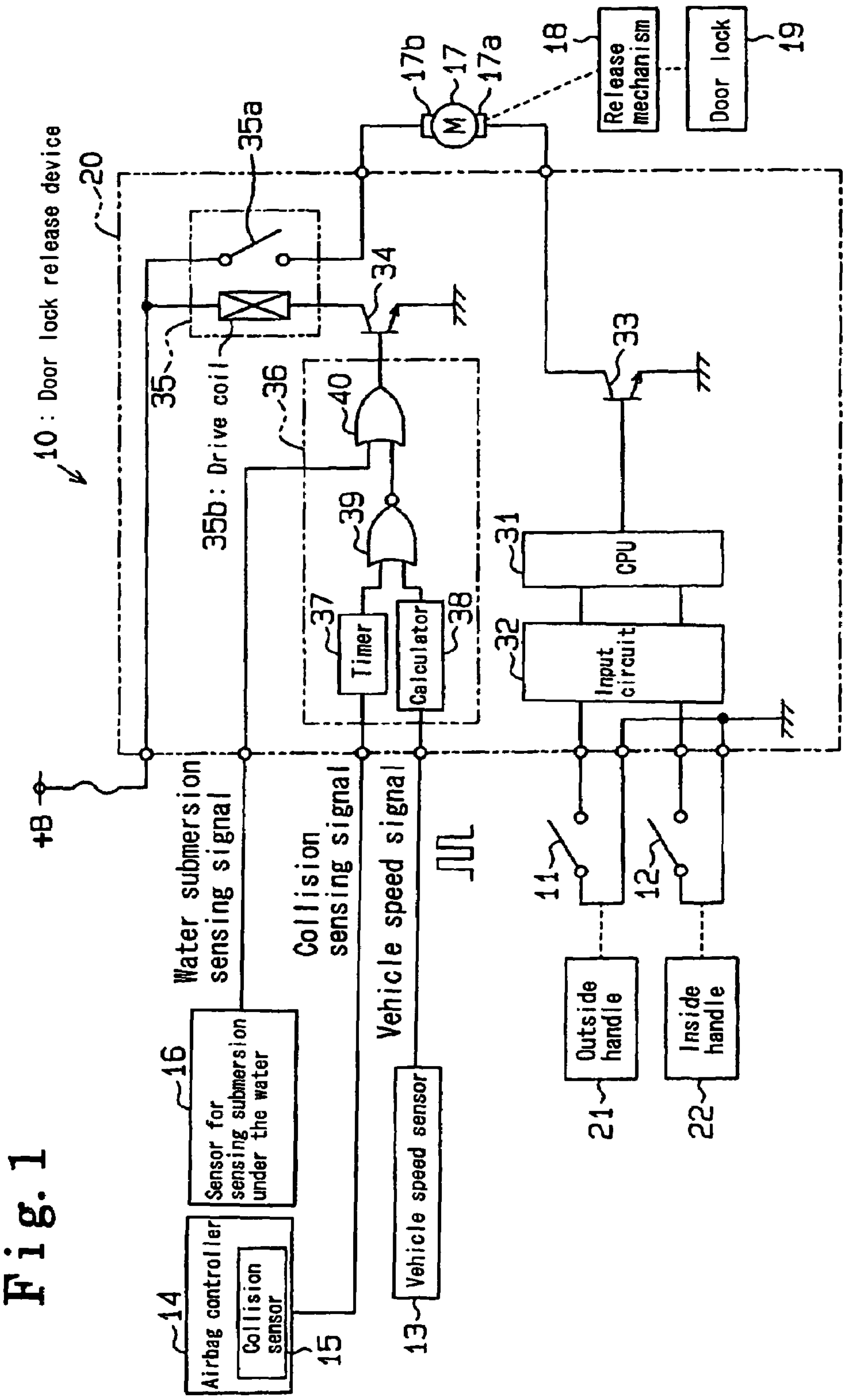
FIG. 1 is a block diagram of a door lock release device according to a first embodiment of the present invention.

Embodiments of a door lock release device will be explained with reference to the illustrations in the drawing figures. Referring to FIGS. 1–4, the door lock release device according to a first embodiment of the present invention will be explained. As shown in FIG. 1, a door lock release device 10 includes an outside handle operation switch 11 (i.e., serving as a first detection means) and an inside handle operation switch 12 (i.e., serving as the first detection means), a vehicle speed sensor 13 (i.e., serving as a second detection means), a collision sensor 15 included in an airbag controller 14, a sensor 16 for sensing submersion under water, a release actuator 17 (i.e., serving as an actuator), a release mechanism 18 operatively connected to the release actuator 17, a door lock 19, and a controller 20.

The outside handle operation switch 11 corresponds to an ON-OFF switch for detecting an operation of an outside handle 21 serving as a door handle equipped on an outer panel of a vehicle door (not shown). The outside handle operation switch 11 is connected to the controller 20.

The inside handle operation switch 12 corresponds to an ON-OFF switch for detecting an operation of an inside handle 22 serving as the door handle equipped on an inner panel of the vehicle door. The inside handle operation switch 12 is connected to the controller 20.

The vehicle sensor 13 is equipped, for example, on a rear portion of an output shaft of a transmission (not shown) for outputting a pulse (i.e., meter pulse) as a vehicle speed signal every rotation of the transmission by a predetermined angle. The vehicle speed sensor 13 is connected to the controller 20.

The collision sensor 15 detects the impact (i.e., inertia force) by the collision. The collision sensor 15 outputs a collision sensing signal which becomes H (i.e., high) level by receiving the impact equal to or greater than a predetermined value. The collision sensor 15 is connected to the controller 20.

The sensor 16 for sensing submersion under the water detects submersion of the vehicle under the water based on a variation of the capacitance due to, for example, floods. The sensor 16 for sensing submersion under the water outputs an sensing signal for submersion under the water which becomes a high level (i.e., H level) by detecting the capacitance corresponding to the case the vehicle is flooded.

The sensor 16 for sensing submersion under the water is connected to the controller 20.

The release actuator 17 includes an electric motor for driving the release mechanism 18 by supplying the power from a battery (+B) via the controller 20. The release actuator 17 releases the door lock 19 by transmitting the driving force to the door lock 19 via the release mechanism 18.

The release mechanism 18 includes a link mechanism for transmitting the driving force from the release actuator 17 to the door lock 19.

Figure 4:
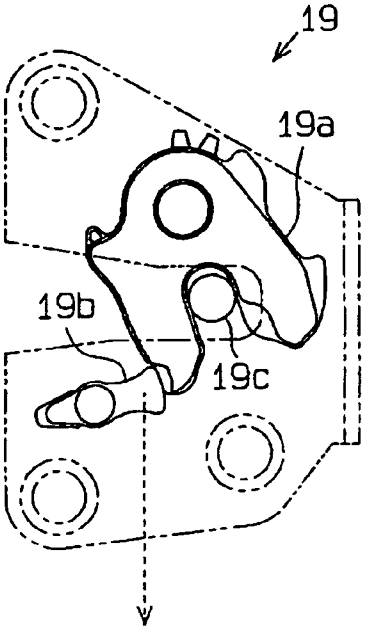
FIG. 4 is a view for showing a configuration of a door lock according to the embodiment of the present invention.

As shown in FIG. 4, the door lock 19 includes a latch mechanism having a latch 19*a* and a pawl 19*b*. The door lock 19 closes the vehicle door by being engaging with a striker 19*c* provided on a vehicle body side. More particularly, the latch 19*a* rotates to be engaged with the striker 19*c* when the vehicle door is closed and simultaneously the vehicle door is closed by preventing the rotation of the latch 19*a* by the pawl 19*b*. On the other hand, when the rotation prevention of the latch 19*a* is released by moving the pawl 19*b*, the latch 19*a* is rotated to return by a restoring force of elastic members (not shown). Accordingly, the release mechanism 18 for transmitting the release of the door lock 19 is connected to the pawl 19*b* of the latch mechanism.

The controller 20 is input with signals from the handle operation switches 11, 12, the vehicle speed sensor 13, the collision sensor 15, and the sensor 16 for sensing submersion under the water for controlling the release actuator 17 in accordance with the vehicle state based on the signals input to the controller 20. Thereafter, by actuating the release actuator 17, the door lock 19 is released via the release mechanism 18, in other words, the opening of the door is controlled.

The controller 20 includes a CPU 31 (i.e., central calculation processing unit) serving as a first control circuit, an input circuit 32, switching transistors 33, 34, an operation prohibition relay 35 serving as a switching circuit, and a calculation device 36 serving as a second control circuit.

The CPU 31 is connected to the handle operation switches 11, 12 via the input circuit 32 for detecting the operation of the outside handle 21 and the inside handle 22 in accordance with the ON-OFF states of handle operation switches 11, 12. When the operation of either one of the outside handle 21 or the inside handle 22 is detected, the CPU 31 outputs the drive signal with the high level (i.e., H level) to a base of the switching transistor 33. The switching transistor 33 corresponds to an NPN transistor, a collector thereof is connected to a first terminal 17*a* of the release actuator 17, and an emitter of the transistor 33 is grounded. Accordingly, by outputting the drive signal with the high level to the switching transistor 33, the switching transistor 33 is turned ON for allowing the actuation of the release actuator 17 by CPU 31.

The operation prohibition relay 35 corresponds to a normal open type switch which includes a movable terminal 35*a* and a drive coil 35*b*. A second terminal 17*b* of the release actuator 17 is connected to the battery via the movable terminal 35*a* of the operation prohibition relay 35. A first end of the drive coil 35*b* is connected to the battery and a second end of the drive coil 35*b* is grounded via the switching transistor 34. Accordingly, the drive coil 35*b* is energized by turning the switching transistor 34 on for activating the operation prohibition relay 35 (i.e., movable terminal 35*a*) to, accordingly, allow the actuation of the release actuator 17.

Thus, the release actuator 17 is driven only by achieving ON state of the both switching transistors 33, 34.

The switching transistor 34 corresponds to the NPN transistor, a collector thereof is connected to the drive coil 35*b*, and the emitter of the switching transistor 34 is grounded. A base is connected to the calculation device 36. Accordingly, the switching transistor 34 becomes ON by outputting the drive signal with the high level (i.e., H level) from the calculation device 36.

The calculation device 36 includes a timer 37, a calculator 38, a NOR circuit 39, and an OR circuit 40. The timer 37 is connected to the collision sensor 15 for outputting the collision sensing signal to a first input terminal of the NOR circuit. The timer 37 outputs a signal to the first terminal of the NOR circuit 39. The signal output from the timber 37 varies from a low level (i.e., L level) to a high level (i.e., H level) synchronizing to the variation of the collision sensing signal varying from the low level to the high level. The signal output from the timber 37 also varies from the high level to the low level after elapsing a predetermined time T (e.g., 10 seconds). In other words, the timer 37 maintains the signal of the high level for the predetermined time T by varying the collision sensing signal from the low level to the high level.

The calculator 38 is connected to the vehicle speed sensor 13. The calculator 38 includes a comparator for outputting a signal with the low level to a second terminal of the NOR circuit 39 when the vehicle speed corresponding to a pulse width of the vehicle speed signal is equal to or less than a predetermined speed (e.g., 3 km/h).

Accordingly, the NOR circuit 39 outputs the signal with the high level when the signal with the low level is input from the both timer 37 and the calculator 38. The signal with the high level is output when the predetermined time T has elapsed after the collision sensing signal is varied from the low level to the high level and the vehicle speed corresponding to the pulse width of the vehicle speed signal is equal to or less than the predetermined speed.

A first input terminal of the OR circuit 40 is connected to the sensor 16 for sensing submersion under the water and a second input terminal is connected to an output terminal of the NOR circuit 39. Thus, the OR circuit 40 outputs the signal with the high level when the signal with the high level is input from either one of the sensor 16 for sensing submersion under the water or the NOR circuit 39. The output terminal of the OR circuit 40 is connected to the base of the switching transistor 34 for turning ON the switching transistor 34 by outputting the signal with the high level. The operation prohibition relay 35 is activated when the predetermined time T has elapsed after varying the collision sensing signal from the low level to the high level and the vehicle speed corresponding to the pulse width of the vehicle speed signal is equal to or less than the predetermined speed, or when the submersion under the water is detected.

Figure 2:
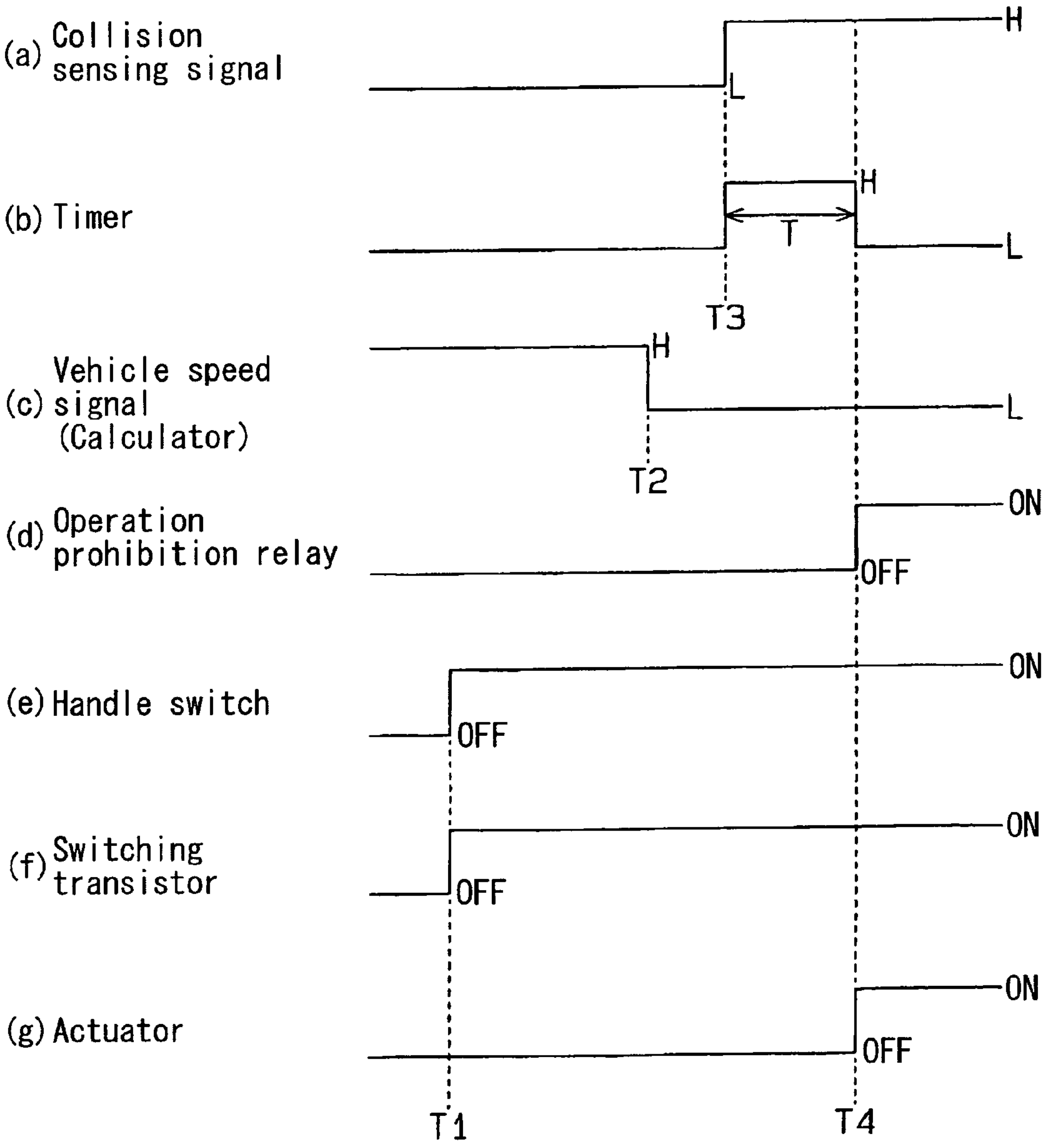
FIG. 2 is a time chart for showing an operation of the door lock release device according to the first embodiment of the present invention.

FIG. 2 is a time chart showing an example of an operation of the door lock release device 10: (a) indicates the collision sensing signal; (b) indicates the output signal from the timer 37; (c) indicates the output signal from the calculator 38 based on the vehicle speed signal; (d) indicates ON-OFF states of the operation prohibition relay 35; (e) indicates ON-OFF states of either one of the outside handle operation switch 11 or the inside handle operation switch 12; (f) indicates ON-OFF states of the switching transistor 33; and (g) indicates ON-OFF states of the release actuator 17. The operation corresponding to the collision sensing signal from the collision sensor 15 and the vehicle speed signal from the vehicle speed sensor 13 is mainly explained.

As shown in FIG. 2, the handle operation switch 11 (12) is switched from OFF state to ON state at time T1 (i.e., (e)). In this case, the CPU 31 detects the operation of the outside handle 21 (i.e., inside handle 22 in case the handle operation switch 12 is ON) and outputs the drive signal to the switching transistor 33 cooperated to the detection of the operation of the handle. Thus, the switching transistor 33 is ON to activate the first terminal 17*a* of the release actuator 17 for allowing the actuation of the release actuator 17 by the CPU 31 (i.e., (f)).

The output signal from the calculator 38 corresponding to the vehicle speed is varied from the high level to the low level at time T2 by the reduction of the vehicle speed (i.e., (c) of FIG. 2). The output signal level is varied from the high level to the low level at time T3 (i.e., (a) of FIG. 2). In this case, the output signal from the timer 37 is varied from the low level to the high level and is varied from the high level to the low level at time T4 after elapsing a predetermined time T after the time T3 (i.e., (b) of FIG. 2). Accordingly, the switching transmitter 34 is ON to turn ON the operation prohibition relay 35 (i.e., (d) of FIG. 2). The second terminal 17*b* of the release actuator 17 is activated to allow the actuation of the release actuator 17 by the operation prohibition relay 35 (i.e., calculation device 36).

In the foregoing manner, the release actuator 17 is supplied with the power by the battery to release the lock of the door lock 19 via the release mechanism 18 (i.e., (g) of FIG. 2).

Figure 3:
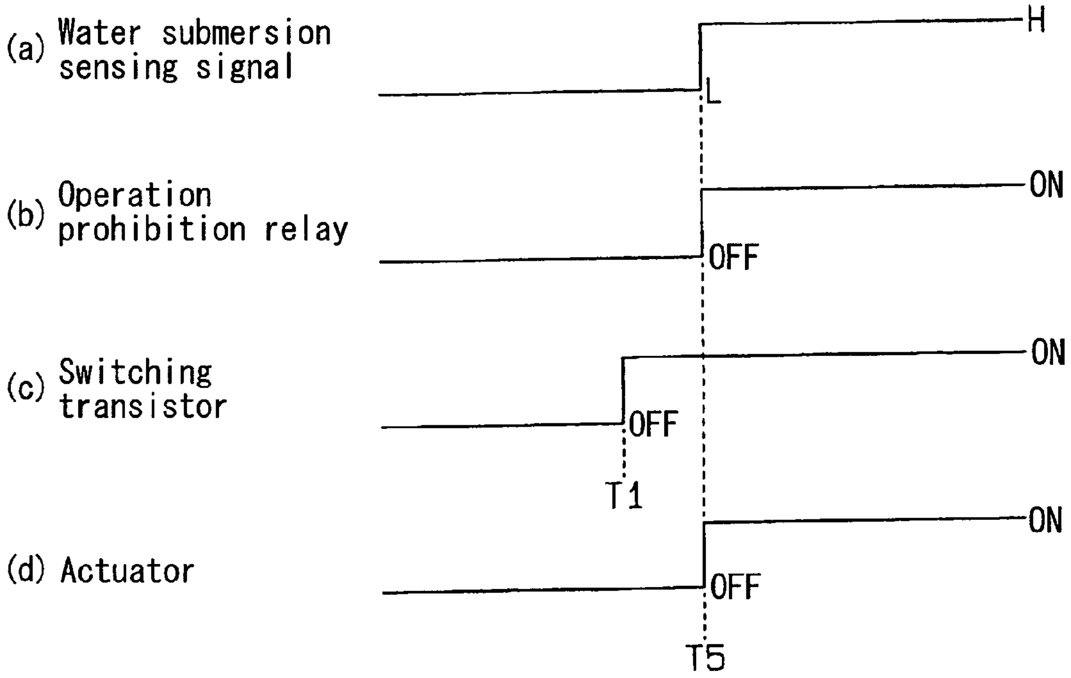
FIG. 3 is a time chart for showing an operation of the door lock release device according to the first embodiment of the present invention.

FIG. 3 shows a time chart showing an example of the operation of the door lock release device 10: (a) indicates the sensing signal for submersion under the water; (b) indicates ON-OFF states of the operation prohibition relay 35; (c) indicates ON-OFF states of the switching transistor 33 (i.e., ON-OFF states of the outside handle operation switch 11 or the inside handle operation switch 12); and (d) indicates ON-OFF states of the release actuator 17. The operation corresponding to the sensing signal for submersion under the water from the sensor 16 for sensing submersion under the water is mainly explained.

The switching transistor 33 is switched from OFF state to ON state at the time T1 (i.e., (c) of FIG. 3). Thus, the first terminal 17*a* of the release actuator 17 is activated to allow the actuation of the release actuator 17 by the CPU 31.

The submersion under the water is detected by the sensor 16 and the sensing signal for submersion under the water is varied from the low level to the high level at time T5 (i.e., (a) of FIG. 3). Thus, the switching transmitter 34 is ON for turning ON the operation prohibition relay 35 (i.e., (b) of FIG. 3). The second terminal 17*b* of the release actuator 17 is activated to allow the actuation of the release actuator 17 by the operation prohibition relay 35 (i.e., calculation device 36).

With the foregoing manner, the power is supplied to the release actuator 17 by the battery for releasing the door lock 19 via the release mechanism 18 (i.e., (d) of FIG. 3).

With the door lock release device of the foregoing embodiment of the present invention, the following effects can be obtained.

According to the embodiment of the present invention, the door lock release device 10 includes the CPU 31 for controlling the release actuator 17 based on the operation of the handle operation switches 11, 12 and the calculation device 36 independent from the CPU 31 for controlling the release actuator 17 based on the signals from the vehicle speed sensor 13, the collision sensor 15, and the sensor 16 for sensing submersion under the water. Accordingly, even when one of the CPU 31 and the calculation device 36 is overridden, the release actuator 17 is controlled by the other of the CPU 31 and the calculation device 36. Thus, the erroneous operation of the door lock release and the unexpected, or undesired door opening can be restrained. In addition, the erroneous operation of the door lock release and the unexpected, or undesired door opening can be restrained even when one of the switching transistors 33, 34, and the operation prohibition relay 35 is failed.

According to the embodiment of the present invention, the calculation device 36 controls the release actuator 17 by ON-OFF controlling of the normal open type operation prohibition relay 35. Accordingly, for example, when the calculation device 36 is unable to be operated, the operation prohibition relay 35 maintains the OFF state to block the power supply line of the release actuator 17. Thus, the erroneous operation of the door lock release and the unexpected, or undesired door opening can be further restrained.

According to the embodiment of the present invention, the calculation device 36 restrains the door opening by prohibiting the actuation of the release actuator 17 immediately after detecting the. collision. For example, the door lock release device according to the embodiment of the present invention restrains the door opening even when the erroneous judgment for handle operation is generated immediately after detecting the collision by the CPU 31 and when the handle operation switches 11, 12 and the signal line are damaged to be failed under keeping ON state due to the collision. In addition, the calculation device 36 allows the actuation of the release actuator 17 when the elapse of the predetermined time T is detected after detecting the collision. Accordingly, the door can be opened by the third party after the collision to rescue the occupants. The confinement of the occupants can be prevented because the performance for restraining the door opening is reset after elapsing the predetermined time (i.e., signal becomes the low level) T even when the erroneous detection of the collision by the collision sensor 15 and other defection error is performed.

According to the embodiment of the present invention, the door opening during the vehicle driving can be restrained because the calculation device 36 prohibits the actuation of the release actuator 17 when the vehicle speed corresponding to the pulse width of the vehicle speed is greater than (i.e., faster than) the predetermined speed.

According to the embodiment of the present invention, the calculation device 36 allows the actuation of the release actuator 17 when the submersion under the water is detected prior to the detection of other vehicle states (i.e., vehicle speed, collision). Accordingly, swift door opening and the evacuation of the occupants can be achieved at the submersion under the water such as floods and a fall into the water.

A second embodiment of the door lock release device according to the present invention will be explained with reference to FIG. 5. With the door lock release device of the second embodiment, the switching transistor 34, the operation prohibition relay 35, and the calculation device 36 of the first embodiment are omitted and the collision sensing signal from the collision sensor 15 is output to the CPU 31. The sensor 16 for sensing the submersion under the water and the vehicle speed sensor 13 are not included. The battery and the second terminal 17*b* of the release actuator 17 are always energized. Further, with the door lock release device according to the second embodiment, the CPU 31 corresponding to the operation of the door handles 21, 22 includes a program for performing the door lock release control serving as the independent second control circuit at the detection of the impact by the collision sensor 15. The same numerals are applied to the construction the same with the first embodiment and the explanation is not repeated.

Figure 5:
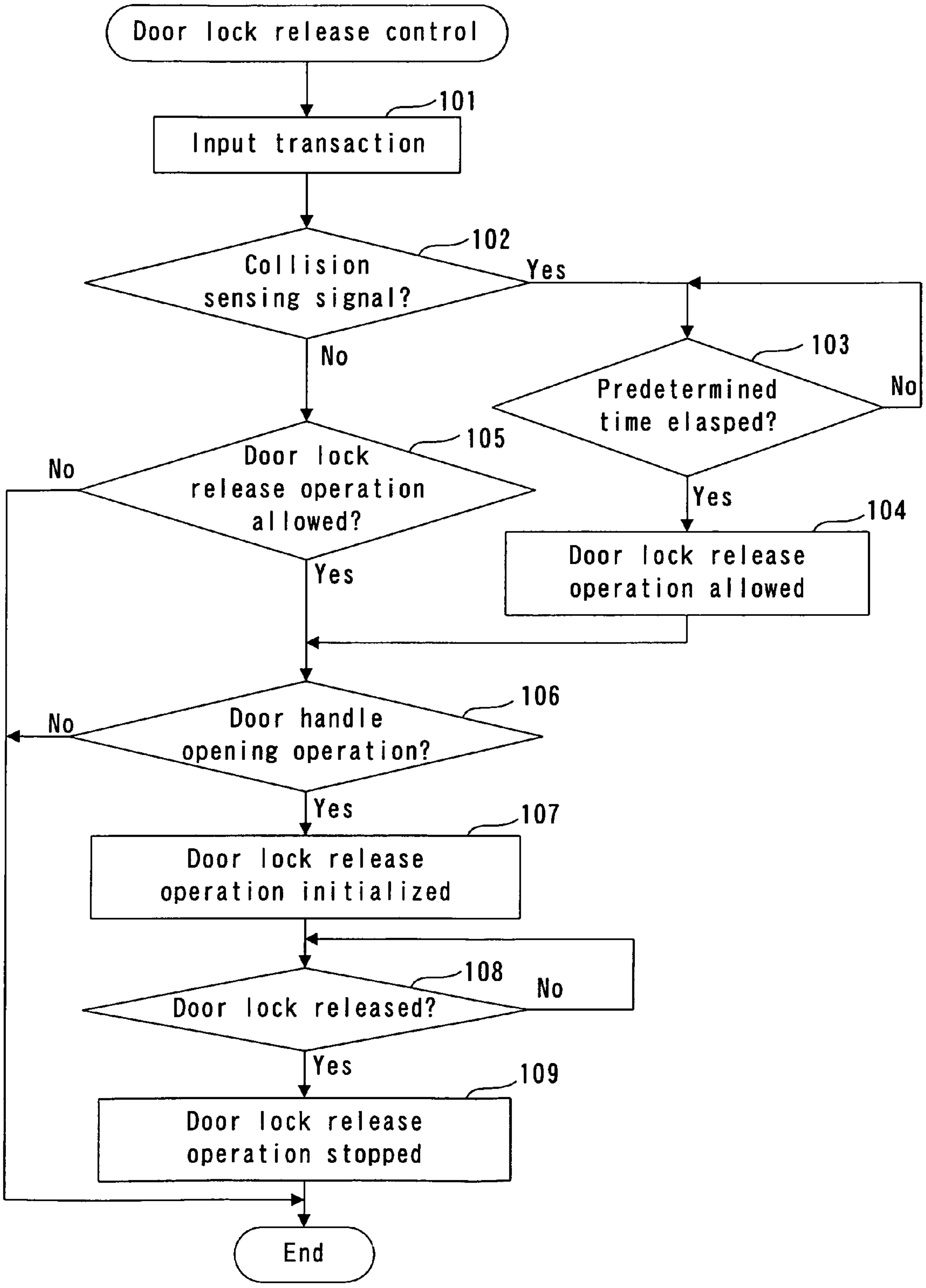
FIG. 5 is a flowchart showing a second embodiment of the present invention.

FIG. 5 shows a flowchart showing the door lock release of the second embodiment of the present invention. The transaction of FIG. 5 is performed by inserting the transaction by every predetermined cycle. When the transaction is moved to the routine, the CPU 31 performs input transactions for various data in Step 101. Thereafter, the transaction of the CPU 31 is forwarded to Step 102.

In Step 102, the CPU 31 judges whether the collision sensing signal with the high level is input from the collision sensor 15, in other words, judges whether the impact at the collision is detected. When it is judged that the collision sensing signal with the high level is input, the transaction of the CPU 31 is forwarded to Step 103. In Step 103, it is judged whether a predetermined time T has elapsed since the collision sensing signal is varied from the low level to the high level. The elapse of the predetermined time T is detected by initiating the count up of a timer built-in the CPU 31 synchronizing to the variation of the collision sensing signal from the low level to the high level.

When it is judged that the predetermined time T has not passed, the transaction of Step 103 is repeated until the predetermined time T is elapsed. When it is judged that the predetermined time T has elapsed, the transaction of the CPU 13 advances to Step 104 to perform the determination to allow the door lock release operation allowance. The determination for allowing the door lock release operation after elapsing the predetermined time prevents the unexpected or undesired door opening immediately after the collision. The transaction of the CPU 31 advances to step 106 after determining the allowance of the door lock release operation.

When it is judged that the collision sensing signal with the high level is not input from the collision sensor 15 in Step 102, the transaction advances to Step 105 for judging whether the allowance of the door lock release operation is currently determined. When it is judged that the door lock release operation allowance is not determined in Step 105, the CPU 31 ends the transaction for the time being. When it is judged that the allowance of the door lock release operation is determined in Step 105, the CPU 31 advances the transaction to Step 106.

In Step 106, the CPU 31 judges whether either one of the outside handle operation switch 11 or the inside handle operation switch 12 is ON state, in other words, it is judged whether the either outside handle 21 or the inside handle 22 is operated. When it is judged that neither the outside handle operation switch 11 nor the inside handle operation switch 12 is under ON state, the CPU 31 ends the transaction thereafter, When it is judged than the either one of the outside handle operation switch 11 or the inside handle operation switch 12 is under ON state, the CPU 31 starts the operation for door lock release by advancing to Step 107. In practice, the drive signal is output to the switching transistor 33 for supplying the power to the release actuator 17 for initiating the release of the door lock 19 via the release mechanism 18 by driving the release actuator 17.

Thereafter, the transaction of the CPU 31 advances to Step 108 for judging whether it is under the door lock releasing state. In practice, the door lock releasing state is judged based on the signal of a door lock release switch (not shown) outputting ON signal at the release of the door lock 19. On one hand, when it is judged that the it is not under the door lock release state, the transaction of Step 108 is repeated until the CPU 31 achieves the door lock releasing state and the actuation of the release actuator 17 is continued. On the other hand, when is it judged that it is under the door lock releasing state, the transaction of the CPU 31 advances to Step 109 for stopping the door lock release operation. In other words, the CPU 31 stops the drive signal to the switching transistor 33 to stop the release actuator 17.

According to the second embodiment of the present invention, the following effects can be obtained.

With the door lock release device of the second embodiment of the present invention, the operation allowance of the door lock release is waited until the elapse of the predetermined time T irrespective of the operation of the outside handle 21 or the inside handle 22 (i.e., handle operation switches 11, 12) at the detection of the impact by the collision sensor 15. Thus, the vehicle door opening due to the release of the door lock is not performed even when the outside handle 21 or the inside handle 22 (i.e., handle operation switches 11, 12) is damaged.

With the door lock release device of the second embodiment of the present invention, the operation of the door lock release is allowed after elapsing the predetermined time T at the detecting of the impact by the collision sensor 15. Thus, when the third party tries to open the vehicle door for rescuing the occupants, the door lock can be released by operating the outside handle 21.

The present invention is not limited to the foregoing embodiments and may be varied as follows.

With the door lock release device of the first embodiment, the CPU 31 may be constructed with the logical circuit.

With the door lock release device of the first embodiment, a CPU may be adopted in place of the calculation device 36.

Although ON-OFF states of the handle operation switches 11, 12 is detected at the CPU 31 side with the door lock release device of the first embodiment, ON-OFF states of the handle operation switches 11, 12 may be additionally detected at the calculation device 36 side. Although the states (i.e., level) of the vehicle speed sensor 13, the collision sensor 15 and the sensor 16 for sensing submersion under the water is detected at the calculation device 36 side, the state (i.e., level) of the vehicle speed sensor 13, the collision sensor 15 and the sensor 16 for sensing submersion under the water may be additionally detected at the CPU 31 side. The vehicle state detected by the CPU 31 and the calculation device 36 may be substantially the same. Other construction may be applied as long as the two independent control circuits for controlling the actuation of the release actuator 17 are provided and ON-OFF states of the handle operation switches 11, 12 is detected with at least one of the control circuits.

Although the vehicle speed, the collision, and the submersion under the water are detected as the vehicle state according to the first embodiment of the present invention, other items may be detected for indicating the vehicle state.

With the embodiment of the present invention, the door lock release device includes the first control circuit for controlling the actuation of the actuator based on the detected operation of the door handle and the second control circuit independent from the first circuit for controlling the actuation of the actuator based on the detected vehicle state. Thus, the erroneous operation of the door lock release and the unexpected or undesired door opening can be restrained because one of the control circuits controls the actuation of the actuator even when the other of the control circuit overrides.

With the embodiment of the present invention, the second control circuit controls the actuation of the actuator by controlling ON-OFF states of the normal open type switching circuit. Accordingly, the erroneous operation of the door lock release and the unexpected or undesired door opening can be further restrained because the switching circuit cuts the power supply line of the actuator by maintaining the OFF state of the switching circuit in case the second control circuit is inoperable.

With the embodiment of the present invention, the second control circuit allows the actuation of the actuator when the collision is not detected. Thus, the unexpected or undesired door opening can be restrained because the actuation of the actuator is prohibited when the collision is detected.

According to the embodiment of the present invention, the second control circuit prohibits the actuation of the actuator during the predetermined time immediately after the detection of the collision. The door opening is restrained by prohibiting the actuation of the actuator immediately after the detection of the collision. The second control circuit allows the actuation of the actuator when the elapse of the predetermined time is detected after the detection of the collision. Thus, the third party can open the door after the collision to rescue the occupants.

According to the embodiment of the present invention, the second control circuit allows the actuation of the actuator when the detected vehicle speed is smaller than the predetermined value. In other words, when the vehicle speed is large, the actuation of the actuator is prohibited to restrain the door opening during the vehicle driving.

According to the embodiment of the present invention, the second control circuit allows the actuation of the actuator when the submersion under the water is detected. Thus, by allowing the actuation of the actuator prior to the detected result of other vehicle states, swift door opening and the evacuation of the occupants can be achieved at the floods of the vehicle and at the fall of the vehicle into the water.

The principles, preferred embodiment and mode of operation of the present invention have been described in the foregoing specification. However, the invention which is intended to be protected is not to be construed as limited to the particular embodiments disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A door lock release device comprising:

an actuator for releasing a door lock;

a first detection means for detecting an operation of a door handle;

a first control circuit for controlling an actuation of the actuator based on the detected door handle operation;

a second detection means for detecting a vehicle state; and a second control circuit independent from the first control circuit for controlling the actuation of the actuator based on the detected vehicle state;

wherein the door lock is released only when both the first control circuit and the second control circuit output signals for allowing the door lock release.

2. A door lock release device according to claim 1 further comprising:

a normal open type switching circuit provided on a power supply line of the actuator; wherein the second control circuit controlling an actuation of the actuator by controlling ON-OFF of the switching circuit.

3. A door lock release device according to claim 1, wherein the second detection means comprises a collision sensor for detecting a collision; and the second control circuit allows an actuation of the actuator when the collision is not detected.

4. A door lock release device according to claim 1, wherein the second detection means comprises a collision sensor for detecting a collision;

the second control circuit comprises a timer for detecting an elapse of a predetermined time after detecting the collision; and the second control circuit prohibits an actuation of the actuator during the predetermined time after detecting the collision and allows the actuation of the actuator when the elapse of the predetermined time is detected.

5. A door lock release device according to claim 1, wherein the second detection means comprises a vehicle speed sensor for detecting a vehicle speed; and the second control circuit allows the actuation of the actuator when the detected vehicle speed is smaller than a predetermined value.

6. A door lock release device according to claim 1, wherein the second detection means comprises a sensor for sensing a submersion under water for detecting the submersion under the water; and the second control circuit allows the actuation of the actuator when the submersion under the water is detected.

7. A door lock release device controlling method comprising:

actuating an actuator for releasing a door lock based on an operation of a door handle detected by a first detection means and a vehicle state detected by a second detection means; wherein said door lock release device actuates the actuator for releasing the door lock when an actuation of the actuator is allowed by both a first control circuit for controlling the actuation of the actuator based on the detected operation of the door handle and a second control circuit provided independent from the first control circuit for controlling the actuation of the actuator based on the detected vehicle state.

8. A door lock release device controlling method according to claim 7 comprising controlling steps of:

switching the first detection means from OFF to ON state;

outputting a drive signal by the first control circuit to a first switching transistor by detecting the operation of the door handle for allowing the actuation of the actuator;

varying a collision sensing signal detected by the second detection means from a low level to a high level and varying the collision sensing signal from the high level to the low level after elapsing a predetermined time period under a state that a vehicle speed signal detected by the second detection means is varied from the high level to the low level corresponding to a decrease of a vehicle speed less than a predetermined speed for activating a second switching transistor for turning on a switching circuit for allowing the actuation of the actuator by the switching circuit; and supplying a power to the actuator from a battery in accordance with the allowance of the actuation by both the first switching transistor and the switching circuit for releasing the door lock.

9. A door lock release device controlling method according to claim 7 comprising controlling steps of:

switching a first switching transistor from OFF to ON state for allowing the actuation of the actuator by the first control circuit;

turning ON a switching circuit by turning ON a second switching transistor by varying a signal of a sensor for sensing submersion under water from a low level to a high level by detecting a submersion under the water detected by the second detection means for allowing the actuation of the actuator; and actuating the actuator for releasing the door lock when the actuation of the actuator is allowed by both the first control circuit and the switching circuit; wherein the actuation of the actuator is allowed when detecting the submersion under the water regardless of other vehicle states.

* * * * *